United States Patent Office 2,844,515
Patented July 22, 1958

2,844,515

MEDIUM AND METHOD FOR THE MASS CULTURE OF MICROORGANISMS

Harry Sobotka, New York, Seymour H. Hutner, Hastings on the Hudson, and Herman Baker, Flushing, N. Y., assignors, by mesne assignments, to the United States of America as represented by the Secretary of the Navy No Drawing. Application July 17, 1953
Serial No. 368,834

22 Claims. (Cl. 195—100)

This invention relates to a medium and method for the mass culture of microorganisms. More particularly, this invention relates to a standardizable medium and method for the mass culture of microorganisms. In one of its aspects this invention relates to a synthetic growth medium suitable for the mass culture of microorganisms whereby uniform and reproducible microorganism growth is possible.

The mass culture of microorganisms is of interest as a method for the production of materials such as enzymes and antibiotics. Materials such as enzymes and antibiotics are products of metabolism of certain microorganisms and oftentimes can only be produced in significant and useful quantities by the mass culture of those microorganisms which produce the same.

It is known that animals and microorganisms require certain "trace elements" as growth factors, i. e. materials which are necessary for growth and in the absence of which growth is inhibited or impossible. Trace elements are those elements, usually metals, which, although their physiological role is oftentimes obscure, are essential for the growth of animals and microorganisms. These elements are usually present in minute or trace amounts in the microorganism and in its environment and hence have been referred to as "trace elements." Exemplary of some of these trace elements, all or some of which may be required as a necessary growth factor for a particular microorganism, are cobalt, calcium, boron, zinc, manganese, copper, magnesium, sodium, potassium and iron. Usually trace elements are present in the microorganism in such minute amounts that their detection by conventional chemical and physical methods is difficult, if not impossible. However, special microbiological assay techniques have been developed for the detection, qualitative and quantitative, of trace elements in animals and in microorganisms.

In the laboratory culture of microorganisms such as bacteria, the growth medium usually contains such natural substrates as yeast autolysate, liver extract, peptones, meat infusions and the like, all of which contain in varying amounts those trace elements necessary for the growth of the particular microorganism being cultured. However, the amounts and the availability of the trace elements in these natural substrate materials varies with the particular source and as a result reproducible results in the growth of microorganisms have been obtained heretofore only with difficulty. Furthermore, these natural substrate materials are expensive. A universal, standardized growth medium is difficult and substantially impossible to define and establish when such natural substrates are employed in the growth medium.

In the mass culture of microorganisms wherein a heavy growth of a particular microorganism is desired, certain unique growth problems are presented. It is desirable that there be present in the growth medium an amount or concentration of the trace elements which will support a heavy growth of the microorganism being cultured. It has been found, however, that during the initial stage of microorganism growth a concentration of the trace elements necessary to support heavy growth produces an inhibitory or toxic effect upon the microorganism and as a result a heavy growth is all but impossible. Additionally, the products of metabolism arising out of the growth of the microorganism exert an inhibitory and toxic effect upon the growth of the microorganism and effectively limit the extent of microorganism growth actually obtainable, usually substantially below that which is theoretically possible in the absence of these products of metabolism. The problem, therefore, in the mass culture of microorganisms is to get the microorganism over the initial barrier to growth due to the relatively high concentration of the trace elements in the growth medium and at the same time to maintain the growth of the microorganism at a high rate till maximum growth is attained by compensating for or neutralizing the inhibitory effects of the products of metabolism which are produced as the microorganisms grow.

The use of a chelating or sequestering agent for the trace elements in the growth medium has been proposed. The chelating agent forms complexes with the trace elements present in the growth medium and in effect reduces the actual or effective concentration of the trace elements below the toxic or inhibitory limit. At the same time, however, the chelating agent must release the trace elements from the formed complexes at the rate demanded by the microorganism in order to sustain its continued and heavy growth. Unfortunately, most of the chelating agents such as the citrates and gluconates, which form soluble complexes, are metabolized during the growth of the microorganism and after a relatively short period of time these metabolizable chelating agents are consumed by the microorganism and their chelating effect lost with the result that the relatively high concentration of trace elements thereby released inhibits the growth of the microorganism and the maximum desired heavy growth is unobtainable. The use of a non-metabolizable chelating agent has also been proposed but the growth media suggested heretofore containing a non-metabolizable chelating agent have not been satisfactory for the mass culture of microoganisms because of the interfering inhibitory effects of the products of metabolism of the microorganisms. Furthermore, as another complicating fact, if the substrate employed in the growth medium for the growth of the microorganism possesses chelating properties, the substrate itself will exhibit an inhibitory effect upon the growth of the microorganism by effectively removing the trace elements from the growth medium unless the amount or concentration of the trace elements in the growth medium is increased in order to compensate for the chelating properties of the substrate.

Once microorganism growth has been initiated the amount of the products of metabolism of the microorganism in the growth medium increases. Oftentimes these products of metabolism, such as the hydroxy carboxylic acids and the amino acids, are themselves chelating agents and form complexes with the trace elements and accordingly reduce the supply of the trace elements in the growth medium necessary to sustain a heavy growth of the microorganism. Additionally, these products of metabolism are oftentimes acidic or basic in nature and as a result decrease or increase the pH of the growth medium to a value such that further growth of the microorganism within the medium ceases. Heretofore no medium or method suitable for the mass culture of microorganisms which permits not only the presence in the growth medium of the large amounts or concentrations of trace elements required to sustain a heavy microorganism growth but which at the same time also compensates for and obviates the interfering growth-inhibitory effects brought about by the presence in the growth medium of the products of metabolism of the microorganism, has been proposed.

It is an object of this invention to provide a medium and a method suitable for the mass culture of microorganisms.

It is another object of this invention to provide a standardizable medium and method suitable for the mass culture of microorganisms whereby uniform, reproducible microorganism growth is obtainable.

Another object of this invention is to provide a medium and a method suitable for the mass culture of microorganisms wherein the initial toxic and inhibitory effects of the relatively high concentrations of the trace elements present in the growth medium in order to obtain a heavy growth of the microorganism, are eliminated and wherein the inhibitory effects due to the products of metabolism of the microorganism undergoing growth are compensated for and overcome.

Still another object of this invention is to provide a medium and method for the mass culture of microorganisms wherein the conditions under which the growth of the microorganism takes place, are maintained substantially unchanged and favorable for the growth of the microorganism.

These and other objects of this invention and how they are accomplished will become more apparent with reference to the accompanying disclosure.

We have discovered that the mass culture of microorganisms is advantageously carried out in a growth medium which contains those trace elements which are necessary for the growth of said microorganism in amounts sufficient for the mass culture of said microorganism, together with a non-metabolizable chelating agent capable of forming complexes with said trace elements, said chelating agent being present in an amount sufficient to reduce the concentration of the trace elements below their toxic or inhibitory limit, and a non-metabolizable pH buffer for said growth medium in an amount sufficient to maintain said growth medium during the growth of said microorganism therein at a pH within the range suitable for the growth of said microorganism.

In accordance with the practice of this invention, it is possible to initiate the growth of the microorganism in the growth medium despite the fact that there are present in the growth medium amounts or concentrations of trace elements which, were it not for the non-metabolizable chelating agent present, would inhibit the growth of or poison the microorganism. Still in accordance with the practice of this invention, it is possible to maintain and produce a heavy growth of the microorganism despite the fact that the products of metabolism of the microorganism would inhibit and eventually cause the growth of the microorganism to cease, were it not for the non-metabolizable pH buffer which is present in the growth medium in order to maintain the pH of the medium within the range suitable for the growth of the microorganism. Still in accordance with the practice of this invention, we have provided a growth medium suitable for the mass culture of microorganisms wherein under all conditions of growth there is available to the microorganism being cultured the necessary amount of trace elements necessary for its growth, regardless of its rate or amount of growth. This regulation of the amount of the trace elements available for the growth of the microorganism is brought about by the equilibrium or balance between the free trace element and its complex with the non-metabolizable chelating agent in accordance with the law of mass action as indicated by the following equation:

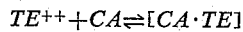

$$TE^{++} + CA \rightleftharpoons [CA \cdot TE]$$

wherein $TE^{++}$ represents the concentration of the ions of the trace elements in the growth medium, CA represents the chelating or sequestering agent and $[CA \cdot TE]$ represents the complex formed between the chelating agent and the trace element. In contemplation of the above, it is seen that the complex $[CA \cdot TE]$ acts as a reservoir for the trace elements, effectively inactivating the trace elements present in the growth medium to such a degree that during the initial stages of the microorganism growth a relatively large concentration of trace elements is possible in the growth medium, but at the same time the amount of actual free trace elements present in the growth medium is such that the growth of the microorganism is not inhibited or poisoned. However, as the growth of the microorganism proceeds and the free trace elements are consumed or taken up by the microorganism, more trace elements are released by the complex so that additional free trace elements are available for further microorganism growth.

In the practice of this invention, it is preferred that the growth medium contain an excess of the trace elements over the amount required to form complexes with the chelating agent present in the growth medium. This excess of trace elements, however, should not be so great as to cause poisoning of the microorganism or to inhibit its growth. An excess of trace elements is desirable in order to compensate for the chelating effect often exhibited by the microorganism substrate material such as a citrate or gluconate which may be present in the growth medium, as well as to compensate for the chelating effect of the products of metabolism of the microorganism being grown.

As indicated hereinabove, the products of metabolism also influence the growth of the microorganism. For example, the products of metabolism are frequently acidic or basic in nature and as these products accumulate within the growth medium the pH of the growth medium gradually decreases or increases, accordingly, until the pH of the growth medium is such that the growth of the microorganism can no longer be sustained and microorganism growth ceases. If metabolizable buffers are added to the growth medium in order to maintain the pH of the growth medium above or below a certain pH value, it has been found that as the growth of the microorganism proceeds, the metabolizable buffers are consumed during the growth of the microorganism with the result that within a relatively short time the buffer has been destroyed and there remains no effective agent for controlling the pH of the growth medium. We have found, however, that by employing a non-metabolizable buffer we can effectively control the pH value of the growth medium during all stages of the growth of the microorganism, from the initial growth stage wherein a relatively small amount of the products of metabolism is present to the heavy growth stage where the amount of the products of metabolism is substantial.

In the growth of microorganisms which produce products of metabolism which are acidic in nature, any suitable non-metabolizable acid buffer can be employed to maintain the pH of the growth medium within the range suitable for microorganism growth. Also in the growth of microorganisms which produce products of metabolism which are alkaline or basic in nature, any suitable non-metabolizable alkaline buffer can be employed to maintain the pH of the growth medium within the range suitable for microorganism growth.

In accordance with one aspect of this invention, we have provided a synthetic growth medium which is suitable for the mass culture of microorganisms. In this synthetic growth medium there is provided in known amounts all those trace elements which are known to be required for the growth of the microorganism being cultured together with a non-metabolizable chelating agent for those trace elements. In addition there is added to the growth medium an amount of a non-metabolizable pH buffer sufficient to maintain the pH of the growth medium during all stages of the microorganism growth at a pH value suitable for the growth of the microorganism. It is desirable to maintain the pH of the growth medium at a value of about 7.0, or at a value in the range 5.5–7.5 since within this range optimum growth of most microorganisms takes place. However it is pointed out that the pH of the growth medium may be maintained at any optimum pH value. To this synthetic growth medium, which is usually an aqueous solution, there is added those other materials which are required for the growth of the particular microorganism being cultured therein. These other materials include a suitable substrate such as sugar, glucose, glycerol, gluconate, etc., depending upon the requirements of the particular microorganism, as well as certain growth factors such as amino acids, e. g., arginine, histidine, proline and certain other growth factors such as thiamine hydrochloride, biotin, riboflavin, and if required, sulphur-containing compounds, also depending upon the particular growth requirements of the microorganism being grown.

A completely synthetic growth medium suitable for the mass culture of microorganisms and which contains in known amount only those particular materials necessary for the microorganism growth such as a suitable substrate, growth factors and trace elements required for microorganism growth, together with a non-metabolizable chelating agent for the trace elements and a non-metabolizable buffer, can be prepared in accordance with the practice of this invention. This synthetic growth medium can be utilized as a standard growth medium for the culture of microorganisms whereby uniform, consistent and reproducible growth results of a particular microorganism can be obtained.

The practice of this invention is particularly applicable to the mass culture of microorganisms which require one or more trace elements as a necessary growth factor and which produce as a product of metabolism a material, acidic or basic in nature, which tends to change the pH of the growth medium to a value such that further microorganism growth is inhibited and substantially impossible.

Microorganisms such as protozoa, molds, yeast, bacteria, to mention a few, are examples of the various kinds of microorganisms which can be successfully grown in mass cultures by employing a growth medium in accordance with this invention. This invention, however, is particularly applicable to the mass culture of molds, such as certain of the actinomycetes which are important as sources of antibiotics, and to the mass culture of bacteria which are important as sources of enzymatic materials. The various types of bacteria, facultatively or obligatory aerobic or anaerobic, can be readily grown in mass culture by employing a growth medium in accordance with this invention. The bacteria may be psychrophilic (growth temperature in the range 0–30° C.), mesophilic (growth temperature in the range 15–45° C.) or thermophilic in nature. Thermophilic bacteria, that is, those bacteria which are capable of growth at a temperature in the range 45–85° C., are particularly well adapted to be grown in mass cultures because they can be easily maintained free from foreign strains of bacteria and because they exhibit a rather high rate of growth and upon death thermophilic bacteria dissolve in the growth medium thereby releasing the enzymic material which may have been formed therein.

The bacterial enzymes are of considerable interest and importance in industry. By an enzyme is meant a substance produced by a living cell or microorganism and which is capable of bringing about a chemical reaction without entering into the reaction itself. In a sense an enzyme acts like a catalyst. There are a large number of enzymes present in nature. Proteolytic enzymes are identified by their power to liquefy gelatin, fibrin and coagulated blood serum and are useful for various applications, for example, in the laundering industry. The number of bacteria which produce proteolytic enzymes is very large and includes Staphylococci, B. subtilis, B. proteus, B. faecalis liquefaciens, Spirillum cholerae asiaticae, B. anthracis, B. tetani, B. pyocyaneus. "Lab" enzymes or coagulases, on the other hand, exhibit the power of coagulating liquid proteins. Coagulating enzymes for milk, proteins, blood and other protein solutions are produced by a large variety of bacteria such as chloera vibrio, B. prodigiosus, and B. pycyaneus. Fat splitting enzymes or lipases exhibit the power of converting fats into glycerol and a fatty acid. Some of the bacteria which produce lipases include chlorea spirillum, B. fluorescens liquefaciens, B. prodigiosus, B. pyocyaneus and Staphlylococcus pyogenes aureus. These bacteria, apart from their importance as sources of lipase, are of industrial significance because of their action in rendering butter, milk, tallow and allied products rancid.

Other enzymes which are known include amylase or starch splitting enzymes, cellulase which causes fermentation of cellulose, invertase which causes cleavage of saccharose into dextrose and levulose, lactic acid enzymes which produce lactic acid from materials such as lactose or dextrose, oxydases or oxidizing enzymes which produce acetic acid from dilute solutions of ethyl alcohol, and the various alcoholic ferments or zymases which convert dextrose or saccharose into ethyl alcohol. One or more of these enzymes are produced by various strains of bacteria. Accordingly these enzymes can be produced in substantial quantity by mass culture of the particular bacteria which produce the enzymes desired.

The non-metabolizable chelating agent which is employed in the preparation of the growth medium in accordance with this invention is ethylenediamine tetraacetic acid or its tetrasodium salt. Also suitable is the calcium disodium salt of ethylenediamine tetraacetic acid. These chelating agents are water soluble and have the ability of forming, non-ionic, non-metabolizable, water soluble, complexes with polyvalent metal ions. Other non-metabolizable chelating agents can also be employed in the practice of this invention.

The non-metabolizable pH buffers which can be employed in the preparation of the microorganism growth medium in accordance with this invention include such alkaline pH buffers as triethanolamine, dihydroxyethyl ethylene diamine, tris(hydroxyamino)methane, and 2-amino-2-methyl propane diol, and such acidic pH buffers as transaconitic acid and tetracarboxybutane. Other non-metabolizable pH buffers can also be employed in the preparation of a microorganism growth medium in accordance with this invention.

The composition of a growth medium exemplary of the practice of this invention and particularly suitable for the mass culture of microorganisms such as bacteria is set forth in the following table:

TABLE I

| Constituent: | Amount |
|---|---|
| Ethylenediamine tetraacetic acid (EDTA) gm__ | 0.05 |
| $KH_2PO_4$ _____gm__ | 0.02 |
| $MgSO_4 \cdot 7H_2O$ _____gm__ | 0.05 |
| Mo (as ammonium moylbdate)_____gm__ | 0.001 |
| Metals TE [1]_____ml__ | 1.5 |
| $NH_4Cl$ _____gm__ | 0.12 |
| Ca (as calcium chloride)_____gm__ | 0.001 |
| Trans-aconitic acid_____gm__ | 0.5 |
| Triethanolamine _____gm__ | 1.0 |
| Distilled water to 100 ml. | |

[1] One ml. of the metals TE solution contains: 2.5 mg. EDTA; 4.0 mg. Zn; 3.0 mg. Mn; 0.25 mg. Cu; 0.1 mg. Fe; 0.1 mg. B (as $H_3BO_3$) and 0.04 mg. Co.

The ethylenediamine tetraacetic acid employed in the preparation of the synthetic growth medium was purified by several crystallizations from water. The amounts of the metals contained in the metals TE solution refer to the actual metal content of the salt employed in the preparation of the solution. These salts were sulfates rather than the hygroscopic chlorides. The calcium chloride was prepared by dissolving calcium carbonate in hydrochloric acid. Since the molybdenum salts are sparingly soluble in acid solutions, the molybdenum containing salt was not combined with the other metal salts in the metals TE solution. To avoid precipitation the ammonium molybdate solution was adjusted to a pH in the range 8.0–8.5 with a suitable alkali. A combination of transaconitic acid and triethanolamine serves as the pH buffer. It is desirable to employ a relatively concentrated or large amount of pH buffer in order to avoid any substantial change in the pH of the growth medium during the growth of the microorganism therein. For example, it has been found that the pH of an unbuffered growth medium during the growth of bacteria therein may in some instances increase to a value greater than 8.5 because of the consumption of the organic acids therein. The liberation of ammonia from the amino acids consumed by the bacteria also tends to increase the pH of the growth medium. As indicated, the growth medium composition set forth in Table I is exemplary and many changes in the proportions of trace elements therein as well as deletions therefrom and additions of other trace elements thereto are possible depending upon the particular requirements of the microorganism to be cultured.

The above-described aqueous growth medium, preparatory to the mass culture of bacteria therein, is adjusted with KOH or $H_2SO_4$ to a pH in the range 6.0–7.0, depending upon the pH tolerance and the particular growth requirements of the bacteria to be grown therein. There is then added to the growth medium a suitable substrate material necessary for the growth of the bacteria, together with the other necessary growth factors such as amino acids, vitamins, sulfur-containing compounds and the like which may be required for the growth of the bacteria. After the above materials have been added to the growth medium the resulting mixture is brought to a suitable growth temperature depending upon the type of bacteria to be grown and is then innoculated with bacteria.

The following is a description of a method employed for growing bacteria in a growth medium prepared in accordance with this invention:

Five ml. of the growth medium solution having the composition set forth in Table I and containing the necessary substrates were added to 10 ml. borosilicate flasks resembling Fernbach flasks in shape. These flasks were incubated within chambers formed by inverting one glass tray over another, and sealing the joint with cellulose tape. Each chamber was of sufficient size to hold thirty-eight 10 ml. flasks. Water was added to the bottom tray in order to minimize the hazards of evaporation and uneven temperatures which are intensified at the incubation temperature employed for the thermophilic bacteria. The incubation temperature for the mesophilic bacteria was 37° C. and the incubation temperature for the thermophilic bacteria was 55° C. The incubation temperature was read from a thermometer placed in an uninoculated flask of the culture medium. It was noticed that the difference between the air temperature in the incubating chamber and in the culture medium was less than 0.5 degree C. Peak growth under these conditions was usually reached in about 5 to 7 days.

The stock cultures of bacteria were maintained on a growth medium having the composition 0.5 g. Nutri-Peptone (Baltimore Biological Laboratory), 0.5 g. beef extract (Difco), 2.0 g. agar, and distilled water up to 100 ml. The pH of this growth medium was adjusted to 6.5–7.0. Subcultures of the bacteria were made monthly and stored in a refrigerator after incubation. Bacteria scraped from agar slopes and suspended in growth medium served as inocula. Bacteria growth was measured in optical density units as determined with a Welch Densichron. It was determined that an optical density (O. D.) of 1.0 was equivalent to 0.5–0.55 g. of dry weight of washed bacteria per liter. Optical density is the logarithm of the ratio of the amount of light entering and leaving a layer of growth medium having a thickness of 1 cm. The following examples are indicative of the practice of this invention:

Example I

A mesophilic strain of B. circulans was cultured in a growth medium having the composition set forth in Table I and which had been adjusted to pH 6.0. An amount of glucose or gluconate equivalent to 0.5% w./v. was added to the growth medium as the substrate. The excess of trace elements in the growth medium helped to compensate for the metal-binding effect of the gluconate. Certain growth factors including thiamine hydrochloride (0.2 mg. percent), biotin (0.5 ug. percent) and riboflavin (5.0 ug. percent) were also added to the growth medium along with certain "reduced sulphur" compounds, i. e., sulphur containing compounds containing sulphur more reduced than sulphates on the biosynthetic pathway to cystine and methionine. The amount of bacteria growth obtained as measured in optical density units was in the range 0.75–0.95.

Example II

A thermophilic strain of B. circulans was cultured in a growth medium having the composition set forth in Table I and which had been adjusted to a pH 6.0. To the growth medium was added an amount of sucrose, gluconate or glycerol equal to about 1% of the growth medium together with L-glutamate (0.5%) or succinate (0.3%), L-arginine hydrochloride (0.05%), and L-histidine hydrochloride (0.02%). It was found that the above described growth media supported a growth having a value, as measured in optical density units, in the range 0.7–1.7.

Example III

A mesophilic strain of B. licheniformis was grown in a growth medium having the composition set forth in Table I and which had been adjusted to pH 6.5. An amount of glycerol or glucose equivalent to 1.0% was added as substrate along with such various growth factors as DL-alanine (0.05%), DL-aspartate (0.05%), L. glutamate (0.05%), glycine (0.05%) L-arginine hydrochloride (0.05%), L-histidine hydrochloride (0.02%) and DL-lysine hydrochloride (0.05%). This particular microorganism grew in flakes whereas the other microorganisms grew diffusely. A growth in the range 0.45 to 0.9 optical density unit was obtained.

Example IV

A thermophilic strain of B. licheniformis was cultured in a growth medium having the composition set forth in Table I and which had been adjusted to pH 6.5. To the growth medium was added suitable substrate material such as glycerol (0.5%), glucose (0.5%) or gluconate (0.5%). A growth up to 1.2 optical density units was obtained.

Example V

A facultative thermophilic strain of B. stearothermophilus was grown in a growth medium having the composition set forth in Table I and which had been adjusted to an initial pH of 6.0. Suitable substrate material such as glucose (1.0%) or sucrose (1.0%) together with such growth factors as thiamine hydrochloride (15 ug. percent), biotin (0.9 ug. percent) and nicotinic acid (0.15 mg. percent) were also added to the growth medium in order to support growth of the bacteria. A bacteria growth equivalent to 1.0 optical density unit was obtained.

Additionally it was found that several strains of facultative thermophilic *B. stearothermophilus* grew to an optical density of 2.4 in a growth medium having the composition set forth in Table I and which had been supplemented with glucose, acetate and those vitamins and amino acids which are necessary as growth factors for these particular strains of bacteria. A thermophilic strain of *B. coagulans* was grown to an optical density value of 2.8 in a growth medium having the composition set forth in Table I and which had been supplemented with glutamate and glycerol or a carbohydrate. A mesophilic *B. sphaericus* was grown to an optical density value 2.2 in a growth medium having the composition set forth in Table I and which had been supplemented with glucose, acetate and amino acids.

From the above it is seen that the relatively inexpensive, synthetic growth media of known compositions and prepared in accordance with this invention are adequate for the mass culture of bacteria despite the obvious simplicity of the compositions of the media. Supplementation of the synthetic growth media with such natural substrate materials as yeast autolysate, liver extracts, peptones and the like seldom increased the bacteria growth more than 0.2–0.4 optical density unit.

After the peak of growth of the microorganism or bacteria has been reached, the antibotic or enzymic materials produced can be recovered in a relatively concentrated form by suitable methods such as by solvent extraction or by physical destruction of the microorganism followed by solvent extraction.

As will be apparent to those skilled in the art upon reading this disclosure, many modifications, substitutions and alterations which do not depart from the spirit or scope of this invention will suggest themselves.

We claim:

1. A process for the mass culture of a microorganism which comprises growing said microorganism in a medium for said microorganism containing those elements necessary in trace amounts for the growth of said microorganism, said elements being present in said medium in amounts sufficient to support a heavy growth of said microorganism therein, together with a non-metabolizable chelating agent selected from a group consisting of ethylenediamine tetraacetic acid, the tetrasodium salt of said acid and the calcium disodium salt of said acid, said chelating agent capable of forming soluble, non-metabolizable complexes with said elements ,said chelating agent being present in said medium in an amount sufficient to reduce the effective concentration of the trace elements therein below their microorganism growth inhibitory value and a non-metabolizable pH buffer for said medium selected from a group consisting of triethanolamine, dihydroxyethyl ethylenediamine, tris-hydroxy-amino methane, 2-amino-2-methyl propane diol, trans-aconitic acid and tetracarboxybutane, said buffer being in an amount sufficient to maintain said medium during the growth of said microoganism at a pH in the range suitable for the growth of said microorganism.

2. A process in accordance with claim 1 wherein said non-metabolizable pH buffer comprises a mixture of dihydroxyethyl ethylene diamine and trans-aconitic acid.

3. A process in accordance with claim 1 wherein said pH buffer comprises a mixture of transaconitic acid and triethanolamine.

4. A process in accordance with claim 1 wherein said non-metabolizable pH buffer comprises a mixture of transaconitic acid and tris-hydroxy-amino methane.

5. A process in accordance with claim 1 wherein said non-metabolizable pH buffer comprises a mixture of triethanolamine and tetracarboxybutane.

6. A process for the mass culture of facultative thermophilic strains of *B. coagulans* wherein as a result the medium in which said strains are cultured tends to decrease in pH to a value such that further growth of the strains therein is inhibited, which comprises growing said strains in a growth medium for said strains containing those elements necessary in trace amounts for the growth of said strains, said elements being present in said medium in amounts sufficient to support a heavy growth of said strains therein, together with a non-metabolizable chelating agent selected from a group consisting of ethylenediamine tetraacetic acid, the tetrasodium salt of said acid, and the calcium disodium salt of said acid, said chelating agent capable of forming soluble, non-metabolizable complexes with said elements, said chelating agent being present in said medium in an amount sufficient to reduce the effective concentration of the trace elements therein below their strains growth inhibitory value and a non-metabolizable pH buffer for said medium selected from a group consisting of triethanolamine, dihydroxyethyl ethylenediamine, tris-hydroxy-amino methane, 2-amino-2-methyl propane diol, trans-aconitic acid and tetracarboxybutane, said buffer being in an amount sufficient to maintain said medium during the growth of said strains therein at a pH in the range suitable for the growth of said strains.

7. A process in accordance with claim 6 wherein said non-metabolizable pH buffer is a mixture of trans-aconitic acid and 2-amino-2-methyl propane diol.

8. A process in accordance with claim 6 wherein said non-metabolizable pH buffer is a mixture of tetracarboxybutane and triethanolamine.

9. A process for the mass culture of facultative thermophilic strains of *B. stearothermophilus* wherein as a result the medium in which said strains are cultured tends to increase in pH to a value such that further growth of the strains therein is inhibited, which comprises growing said strains in a growth medium for said strains containing those elements necessary in trace amounts for the growth of said strains, said elements being present in said medium in amounts sufficient to support a heavy growth of said strains therein, together with a non-metabolizable chelating agent selected from a group consisting of ethylenediamine tetraacetic acid, the tetrasodium salt of said acid and the calcium disodium salt of said acid, said chelating agent capable of forming soluble, non-metabolizable complexes with said elements, said chelating agent being present in said medium in an amount sufficient to reduce the effective concentration of the trace elements therein below their strains growth inhibitory value, and a non-metabolizable pH buffer for said medium selected from a group consisting of triethanolamine, dihydroxyethyl ethylenediamine, tris-hydroxy-amino methane, 2-amino-2-methyl propane dial, trans-aconitic acid and tetracarboxybutane, said buffer being in an amount sufficient to maintain said medium during the growth of said strains therein at a pH in the range suitable for the growth of said strains.

10. A process in accordance with claim 9 wherein said non-metabolizable pH buffer is a mixture of triethanolamine and trans-aconitic acid.

11. A synthetic medium for the mass culture of a microorganism comprising, in combination: a quantity of substratal material sufficient in amount to sustain mass growth of said microorganism; trace elements of the types required for the growth of said microorganism, the concentration of said trace elements relative to the amount of substratal material being at least as great as is required for mass growth of said microorganism; non-metabolizable, chelating means for forming soluble complexes with said trace elements, the amount of said chelating means being sufficient to reduce the effective concentration of said trace elements below the level at which said trace elements tend to have an inhibitory effect upon mass growth of said microorganism; and non-metabolizable pH buffer means for neutralizing the metabolic products produced during growth of said microorganism, the amount of said buffer means being sufficient to maintain the pH factor of said medium within the range suitable for the growth of said microorganism, the addition of said proper amounts of non-metabolizable chelating means and pH buffer to the other ingredients forming a combination which permits such high concentration of trace elements as would ordinarily inhibit growth of said micoorganism and which controls the effect of metabolic products on the pH factor of the medium so as to prevent the pH factor from attaining a value which would inhibit growth of said microorganism, thereby providing a synthetic medium suited to mass growth of said microorganism.

12. A synthetic medium for the mass culture of a microorganism comprising, in combination: a quantity of subtratal material sufficient in amount to sustain mass growth of said microorganism; trace elements of the types required for the growth of said microorganism, the concentration of said trace elements relative to the amount of substratal material being somewhat greater than that required for mass growth of said organism, the excess compensating for any chelating effects exercised by the substratal material and any chelating effects exercised by the metabolic products of the growth of said microorganism; non-metabolizable chelating means for forming soluble complexes with said trace elements, the amount of said chelating means being sufficient to reduce the effective concentration of said trace elements below the level at which said trace elements tend to have an inhibitory effect upon mass growth of said microorganism; and non-metabolizable, pH buffer means for neutralizing the metabolic products produced during growth of said microorganism, the amount of said buffer means being sufficient to maintain the pH factor of said medium within the range suitable for the growth of said microorganism, the addition of said proper amounts of non-metabolizable chelating means and pH buffer to the other ingredients forming a combination which permits such high concentration of trace elements as would ordinarily inhibit growth of said microorganism and which controls the effect of metabolic products on the pH factor of the medium so as to prevent the pH factor from attaining a value which would inhibit growth of said microorganism, thereby providing a synthetic medium suited to mass growth of said microorganism.

13. A medium as set forth in claim 12, wherein said pH buffer comprises a mixture of dihydroxyethyl ethylenediamine and trans-aconitic acid.

14. A medium as set forth in claim 12, wherein said pH buffer comprises a mixture of trans-aconitic acid and triethanolamine.

15. A medium as set forth in claim 12, wherein said pH buffer comprises a mixture of trans-aconitic acid and tris-hydroxy-amino methane.

16. A medium as set forth in claim 12, wherein said pH buffer comprises a mixture of triethanolamine and tetrachraboxybutane.

17. A synthetic medium for the mass culture of a microorganism comprising, in combination: a quantity of substratal material sufficient in amount to sustain mass growth of said microorganism; trace elements of the types required for the growth of said microorganism, the concentration of said trace elements relative to the amount of substratal material being at least as great as is required for mass growth of said microorganism; non-metabolizable, chelating means for forming soluble complexes with said trace elements, the amount of said chelating means being sufficient to reduce the effective concentration of said trace elements below the level at which said trace elements tend to have an inhibitory effect upon mass growth of said microorganism, said chelating means being selected from a group consisting of ethylenediamine tetraacetic acid, the tetrasodium salt of said acid and the calcium disodium salt of said acid; and non-metabolizable pH buffer means for neutralizing the metabolic products produced during growth of said microorganism, said buffer means being selected from the group consisting of triethanolamine, dihydroxyethyl ethylenediamine, tris-hydroxy-amino methane, 2-amino-2-methyl propane diol, trans-aconitic acid and tetracarboxybutane, the amount of said buffer means being sufficient to maintain the pH factor of said medium within the range suitable for the growth of said microorganism, the addition of said proper amount of non-metabolizable chelating means and pH buffer to the other incredients forming a combination which permits such high concentration of trace elements as would ordinarily inhibit growth of said microorganism and which controls the effect of metabolic products on the pH factor of the medium so as to prevent the pH factor from attaining a value which would inhibit growth of said microorganism, thereby providing a synthetic medium suited to mass growth of said microorganism.

18. A medium suitable for the mass culture of bacteria which produce an acidic material as a product of metabolism and wherein as a result the medium in which said bacteria are cultured tends to decrease in pH to a value such that further growth of said bacteria is inhibited, which comprises those elements necessary in trace amounts for the growth of said bacteria, said elements being present in said medium in amounts sufficient to support a heavy growth of said bacteria therein, a non-metabolizable chelating agent capable of forming soluble, non-metabolizable complexes with said elements, said chelating agent being present in said medium in an amount sufficient to reduce the effective concentration of the trace elements therein below their bacteria growth-inhibitory value and a non-metabolizable pH buffer for said medium in an amount sufficient to maintain said medium during the growth of said bacteria therein at a pH in the range suitable for the growth of said bacteria.

19. A medium in accordance with claim 18 wherein said non-metabolizable chelating agent is ethylenediamine tetraacetic acid and said non-metabolizable pH buffer is a mixture of trans-aconitic acid and 2-amino-2-methyl-propane diol.

20. A medium in accordance with claim 18 wherein said non-metabolizable chelating agent is ethylenediamine tetraacetic acid and said non-metabolizable pH buffer is a mixture of tetracarboxybutane and triethanolamine.

21. A medium for the mass culture of bacteria which produce an alkaline material as a product of metabolism and wherein as a result the medium in which said bacteria are cultured tends to increase in pH to a value such that further growth of said bacteria is inhibited, which comprises those elements necessary in trace amounts for the growth of said bacteria, said elements being present in said medium in amounts sufficient to support a heavy growth of said bacteria therein, a non-metabolizable chelating agent capable of forming soluble, non-metabolizable complexes with said elements, said chelating agent being present in said medium in an amount sufficient to reduce the effective concentration of the trace elements therein below their bacteria growth-inhibitory value, and a non-metabolizable pH buffer for said medium in an amount sufficient to maintain said medium during the growth of said bacteria therein at a pH in the range suitable for the growth of said bacteria.

22. A medium in accordance with claim 21 wherein said non-metabolizable chelating is ethylenediamine tetraacetic acid and wherein said non-metabolizable pH buffer is a mixture of triethanolamine and transaconitic acid.

(References on following page)

References Cited in the file of this patent

UNITED STATES PATENTS

| | | |
|---|---|---|
| 1,123,920 | Pollak | Jan. 5, 1915 |
| 2,424,832 | Koerber | July 29, 1947 |
| 2,638,436 | Perlman | May 12, 1953 |
| 2,734,018 | Minieri | Feb. 7, 1956 |

OTHER REFERENCES

Foster: Chemical Activities of Fungi, Academic Press Inc., pub. New York, New York, 1949, pp. 256 to 262.

Werkman et al.: Bacterial Physiology, 1951, Academic Press, pp. 502–503.

Martell et al.: Chemistry of the Metal Chelate Compounds, Prentice-Hall, Inc., 1952, pp. 499 to 510, page 506 particularly relied upon.

La Manna et al.: Basic Bacteriology, 1953, Williams & Wilkins, Baltimore, pp. 359–360.

Levine et al.: Compliation of Culture Media, William & Wilkins, 1930, page 16.

Porter: Bacterial Chemistry and Physiology, John Wiley & Sons, pp. 84 to 87, 841.